US012688741B2

(12) United States Patent
Ahlard et al.

(10) Patent No.: US 12,688,741 B2
(45) Date of Patent: Jul. 21, 2026

(54) PROVIDING A CREDENTIAL FOR USE WITH AN ELECTRONIC LOCK

(71) Applicant: ASSA ABLOY AB, Stockholm (SE)

(72) Inventors: David Ahlard, Skellefteå (SE); Mudit Sethi, Vällingby (SE); Magnus Dürr, Huddinge (SE); Linnea Cronfalk, Stockholm (SE); David Bundgaard, Gustavsberg (SE); Adrian Papari, Skärholmen (SE)

(73) Assignee: ASSA ABLOY AB, Stockholm (SE)

( * ) Notice: Subject to any disclaimer, the term of this patent is extended or adjusted under 35 U.S.C. 154(b) by 401 days.

(21) Appl. No.: 18/570,710

(22) PCT Filed: Jun. 13, 2022

(86) PCT No.: PCT/EP2022/065949
§ 371 (c)(1),
(2) Date: Dec. 15, 2023

(87) PCT Pub. No.: WO2022/263340
PCT Pub. Date: Dec. 22, 2022

(65) Prior Publication Data
US 2024/0290150 A1 Aug. 29, 2024

(30) Foreign Application Priority Data
Jun. 17, 2021 (SE) .................................... 2150779-3

(51) Int. Cl.
*G07C 9/00* (2020.01)

(52) U.S. Cl.
CPC ................................ *G07C 9/00182* (2013.01)

(58) Field of Classification Search
CPC ... G07C 9/00182; G07C 9/00571; G07C 9/27
See application file for complete search history.

(56) References Cited

U.S. PATENT DOCUMENTS 10,929,841 B1 2/2021 Kalaboukis et al.
2014/0040139 A1 2/2014 Brudnicki et al.
(Continued)

FOREIGN PATENT DOCUMENTS

CA 3058557 6/2020
WO 2022263340 12/2022

OTHER PUBLICATIONS

"PCT EP 2022065949 ISR mailed Sep. 27, 2022", 6 pages.
(Continued)

*Primary Examiner* — Nabil H Syed
(74) *Attorney, Agent, or Firm* — Schwegman Lundberg & Woessner, P.A.

(57) ABSTRACT

It is provided a method for providing a credential for use with an electronic lock (7) to access to restricted physical space (16). The method comprises: receiving (40) a credential that unlocks the electronic lock (7); generating (42) a credential identifier associated with the credential; sending (44) the credential identifier to an EAC (5); receiving (46), from an electronic wallet provider (6), a request for the credential, wherein the request comprises the credential identifier; packaging (48) the credential, resulting in packaged credential, wherein the packaging complies with a format, selected from a plurality of formats for different electronic wallet providers, corresponding to the electronic wallet provider from which the request is received, enabling the credential to be provided to an electronic wallet in a user device (2) for unlocking the electronic lock (7); and sending (50) the packaged credential to the electronic wallet provider (6).

17 Claims, 3 Drawing Sheets

(56) References Cited

U.S. PATENT DOCUMENTS

| | | | |
|---|---|---|---|
| 2014/0101042 | A1 | 4/2014 | Grissom et al. |
| 2015/0120472 | A1 | 4/2015 | Aabye et al. |
| 2017/0270517 | A1* | 9/2017 | Vasu .................. G06Q 20/4018 |
| 2018/0268399 | A1 | 9/2018 | Spector et al. |
| 2019/0068565 | A1 | 2/2019 | Bhattacharjee et al. |
| 2019/0095906 | A1* | 3/2019 | Shrivastava ....... G06Q 30/0226 |
| 2019/0259023 | A1* | 8/2019 | Candee ............... H04L 43/0876 |
| 2019/0303919 | A1 | 10/2019 | Aabye et al. |
| 2020/0184464 | A1* | 6/2020 | Zagone ................ G06Q 20/363 |

OTHER PUBLICATIONS

"PCT EP 2022065949 Written Opinion mailed Sep. 27, 2022", 8 pages.
"210252SE_220308_SE Office Action and SE Search Report mailed Mar. 8, 2022", 9 pages.
"210252SE_230525_Swedish Final Notice mailed May 25, 2023", 23 pages.
"210252SE_230525_SE Final Notice mailed Jul. 10, 2023", 3 pages.

* cited by examiner

PROVIDING A CREDENTIAL FOR USE WITH AN ELECTRONIC LOCK

CROSS-REFERENCE TO RELATED APPLICATION(S)

This application is a national stage application under 35 U.S.C. § 371 of PCT Appl. No. PCT/EP2022/065949, titled "Providing a Credential for Use With an Electronic Lock," filed Jun. 13, 2022, which claims priority to Swedish Patent Appl. No. 2150779-3, filed Jun. 17, 2021, each of which is incorporated herein by reference in its entirety.

TECHNICAL FIELD

The present disclosure relates to the field of electronic locks, and in particular to providing a credential for use with an electronic lock, based on an electronic wallet application of a user device.

BACKGROUND

Locks and keys are evolving from the traditional pure mechanical locks. These days, electronic locks are becoming increasingly common. For electronic locks, electronic keys are used for authentication of a user. For situations when keys need to distributed, e.g. for temporary bookings such as for hotels, cruise ships, etc., a device already owned by the user can be used to hold an appropriate credential for accessing a restricted physical space, such as a hotel room, cruise chip cabin.

Smart phones and other portable devices are often provided with an electronic wallet application that can hold credentials for payment loyalty cards etc. Furthermore, such electronic wallet applications can hold credentials for unlocking electronic locks.

There are many different electronic wallet providers, e.g. Google, Apple, Samsung, etc. Such a disparate environment makes the provisioning of credentials very complicated. How can credentials be supported for different electronic wallet providers when it is not known beforehand the electronic wallet application that is installed in the user device?

SUMMARY

One object is to enable the provision of credential using different electronic wallet applications when the type of electronic wallet application is not known at the time that the credential is generated.

According to a first aspect, it is provided a method for providing a credential for use with an electronic lock to access to restricted physical space, the method being performed by a credential delivery device. The method comprises: receiving a credential that, when provided to the electronic lock, unlocks the electronic lock; generating a credential identifier associated with the credential; sending the credential identifier to an electronic access control system, EAC; receiving, from an electronic wallet provider, a request for the credential, wherein the request comprises the credential identifier; packaging the credential, resulting in packaged credential, wherein the packaging complies with a format, selected from a plurality of formats for different electronic wallet providers, corresponding to the electronic wallet provider from which the request is received, enabling the credential to be provided to an electronic wallet in a user device for unlocking the electronic lock; and sending the packaged credential to the electronic wallet provider.

The method may further comprise: receiving a confirmation from the electronic wallet provider that the packaged credential has been delivered to the user device.

The method may further comprise, after the receiving a confirmation: sending a confirmation to the EAC that the packaged credential has been delivered to the user device.

In the receiving credential, the credential may be received from the EAC.

The method may further comprise: verifying that the credential identifier has not previously been used to provide a credential.

The verification may comprise verifying that the credential, associated with the credential identifier, has not previously been included in a packaged credential sent to the electronic wallet provider.

The verifying may comprise verifying by checking the credential identifier against the list of active credential identifiers.

The verifying may comprise verifying by checking the credential identifier against the list of used credential identifiers.

According to a second aspect, it is provided a credential delivery device for providing a credential for use with an electronic lock to access to restricted physical space. The credential delivery device comprises: a processor; and a memory storing instructions that, when executed by the processor, cause the credential delivery device to: receive a credential that, when provided to the electronic lock, unlocks the electronic lock; generate a credential identifier associated with the credential; send the credential identifier to an electronic access control system, EAC; receive, from an electronic wallet provider, a request for the credential, wherein the request comprises the credential identifier; package the credential, resulting in packaged credential, wherein the packaging complies with a format, selected from a plurality of formats for different electronic wallet providers, corresponding to the electronic wallet provider from which the request is received, enabling the credential to be provided to an electronic wallet in a user device for unlocking the electronic lock; and send the packaged credential to the electronic wallet provider.

The credential delivery device may further comprise instructions that, when executed by the processor, cause the credential delivery device to: receive a confirmation from the electronic wallet provider that the packaged credential has been delivered to the user device.

The credential delivery device may further comprise instructions that, when executed by the processor, cause the credential delivery device to: send a confirmation to the EAC that the packaged credential has been delivered to the user device.

The instructions to receive credential may comprise instructions that, when executed by the processor, cause the credential delivery device to receive the credential from the EAC.

The credential delivery device may further comprise instructions that, when executed by the processor, cause the credential delivery device to: verify that the credential identifier has not previously been used to provide a credential.

The instructions to verify may comprise instructions that, when executed by the processor, cause the credential delivery device to: verify that the credential, associated with the credential identifier, has not previously been included in a packaged credential sent to the electronic wallet provider.

The instructions to verify may comprise instructions that, when executed by the processor, cause the credential delivery device to check the credential identifier against the list of active credential identifiers.

The instructions to verify may comprise instructions that, when executed by the processor, cause the credential delivery device to check the credential identifier against the list of used credential identifiers.

According to a third aspect, it is provided a computer program for providing a credential for use with an electronic lock to access to restricted physical space. The computer program comprises computer program code which, when executed on a credential delivery device causes the credential delivery device to: receive a credential that, when provided to the electronic lock, unlocks the electronic lock; generate a credential identifier associated with the credential; send the credential identifier to an electronic access control system, EAC; receive, from an electronic wallet provider, a request for the credential, wherein the request comprises the credential identifier; package the credential, resulting in packaged credential, wherein the packaging complies with a format, selected from a plurality of formats for different electronic wallet providers, corresponding to the electronic wallet provider from which the request is received, enabling the credential to be provided to an electronic wallet in a user device for unlocking the electronic lock; and send the packaged credential to the electronic wallet provider.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein enable the use of electronic wallets applications in user devices for distributing and keeping credentials for unlocking an electronic lock, used for access to restricted physical spaces. This is achieved by a credential delivery device that receives and stores a credential that has been generated for the physical space. The credential delivery device generates a credential identifier associated with the credential. The credential identifier is provided for delivery to the user device. When the user requests the credential to the electronic wallet application from an electronic wallet provider, the request contains the credential identifier. The electronic wallet provider then requests (and includes the credential identifier in the request) the credential from the credential delivery device, which responds with the credential associated with the credential identifier. At this stage, the credential delivery device can identify the electronic wallet provider and packages the credential in the format that complies with the requesting electronic wallet provider. The packaged credential is then provided to the electronic wallet provider that, in turn, provides the credential to the electronic wallet application in the user device. The user can then use the electronic wallet application in the user device to unlock the electronic lock.

Using these embodiments, delivery of a credential to an electronic wallet application is enabled, even when the electronic wallet provider is not known at the time that the credential is generated. Additionally, this solution is easily extended to new electronic wallet formats in the future, or adapted when the format for existing electronic wallet providers changes.

Figure 1:
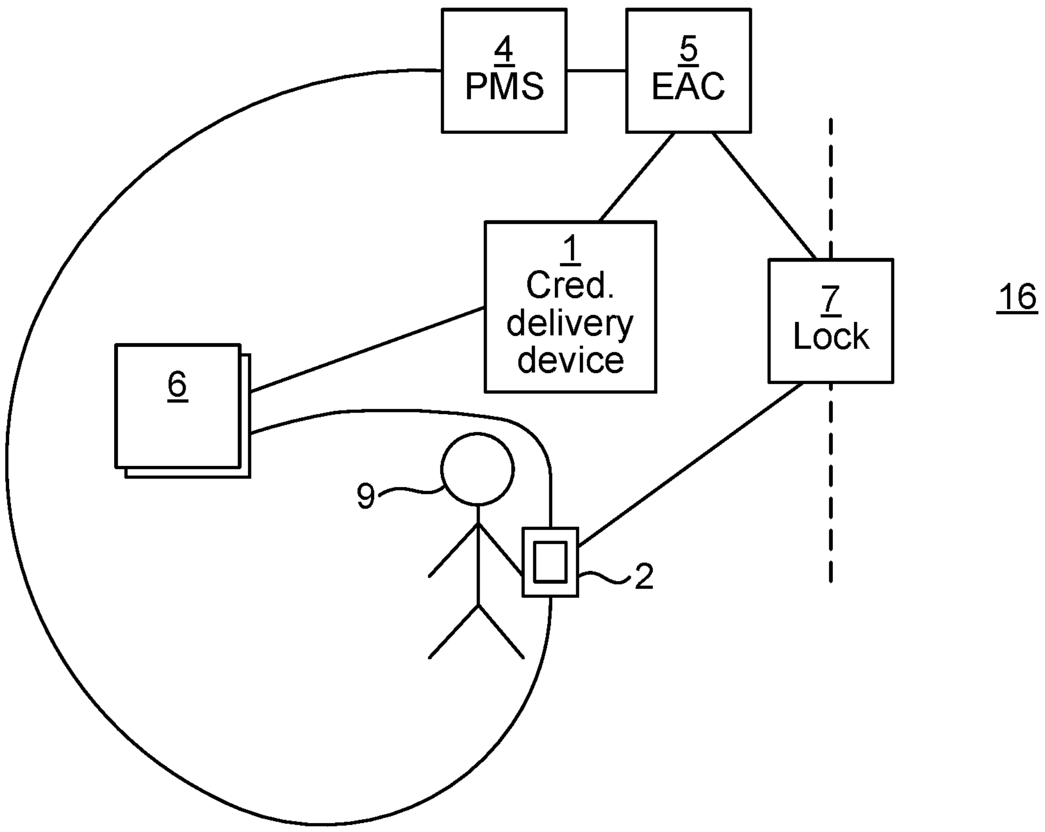
FIG. 1 is a schematic diagram illustrating an environment in which embodiments presented herein can be applied.

FIG. 1 is a schematic diagram illustrating an environment in which embodiments presented herein can be applied. The environment is used to manage access to one or more restricted physical spaces 16 via respective electronic locks 7. The environment can relate to any situation where access rights for physical spaces are managed and credentials need to be distributed, e.g. for hotels, cruise ships, student lodging, temporary lets, office hotels, etc.

A user 9 interacts with a user device 2. The user device 2 can e.g. be a smartphone, a tablet computer, wearable device, dedicated mobile key device, etc., which is capable of communicating with an electronic wallet provider 6 and an electronic lock 7.

Optionally, a property management system (PMS) 4 is used to manage bookings of the property. It is to be noted that whenever the term PMS is used herein, this refers to any system that is capable of performing the actions and responsibilities described herein. For instance, the PMS can be combined physically with the electronic access control system (EAC) mentioned below.

The property comprises one or more electronic locks 7, each controlling access to a restricted physical space 16. The restricted physical space 16 can e.g. be a hotel room, cruise ship cabin, student lodging, temporary let space, office hotel suite, etc.

The electronic access control system (EAC) 5 is a system which can issue electronic credentials for gaining access to one or more of the electronic locks 7. Each such credential can be associated with a particular restricted physical space.

Optionally, additional common spaces are unlockable using such a credential. The EAC 5 can issue electronic credentials which are distributed to an electronic wallet application (app) on the user device 2. As described in more detail below, the credential is provided from the EAC 5, via a credential delivery device 1 and electronic wallet provider 6 to the electronic wallet app on the user device 2. Optionally, the credential delivery device 1 and the EAC 5 are embodied in the same physical device.

The electronic wallet app in the user device can e.g. be a Google Pay app for Android based user device, an Apple Wallet app for iOS devices, a Samsung Pay app for Samsung devices, etc. When a credential is provided in the electronic wallet app of the user device 2, the user device can communicate locally with the electronic lock 7 e.g. using Bluetooth, Bluetooth Low Energy (BLE), NFC (Near Field Communication), etc., to allow the electronic lock 7 to evaluate the credential to grant or deny access. In this way, a valid credential provided to the electronic wallet app in the user device 2 can be used to unlock the electronic lock 7.

The electronic wallet provider 6 needs to match the electronic wallet app in the user device 2. This includes several technical details, including communication, security, etc. For instance, the electronic wallet provider 6 can be Google, Apple, Samsung, or an entity under their control. The format of an item provided from the electronic wallet provider 6 to the electronic wallet app in the user device 2 depends on the electronic wallet provider.

According to embodiments presented herein, credentials issued by the EAC 5 for use with the electronic lock 7 are packaged by the credential delivery device 1 in a format compatible with the electronic wallet provider 6 for use by the electronic wallet app on the user device 2. In this way, the user device 2 is provided with the credential via the electronic wallet provider 6, and can use its electronic wallet app to communicate with the electronic lock 7 to thereby unlock the electronic lock 7.

Figure 2:
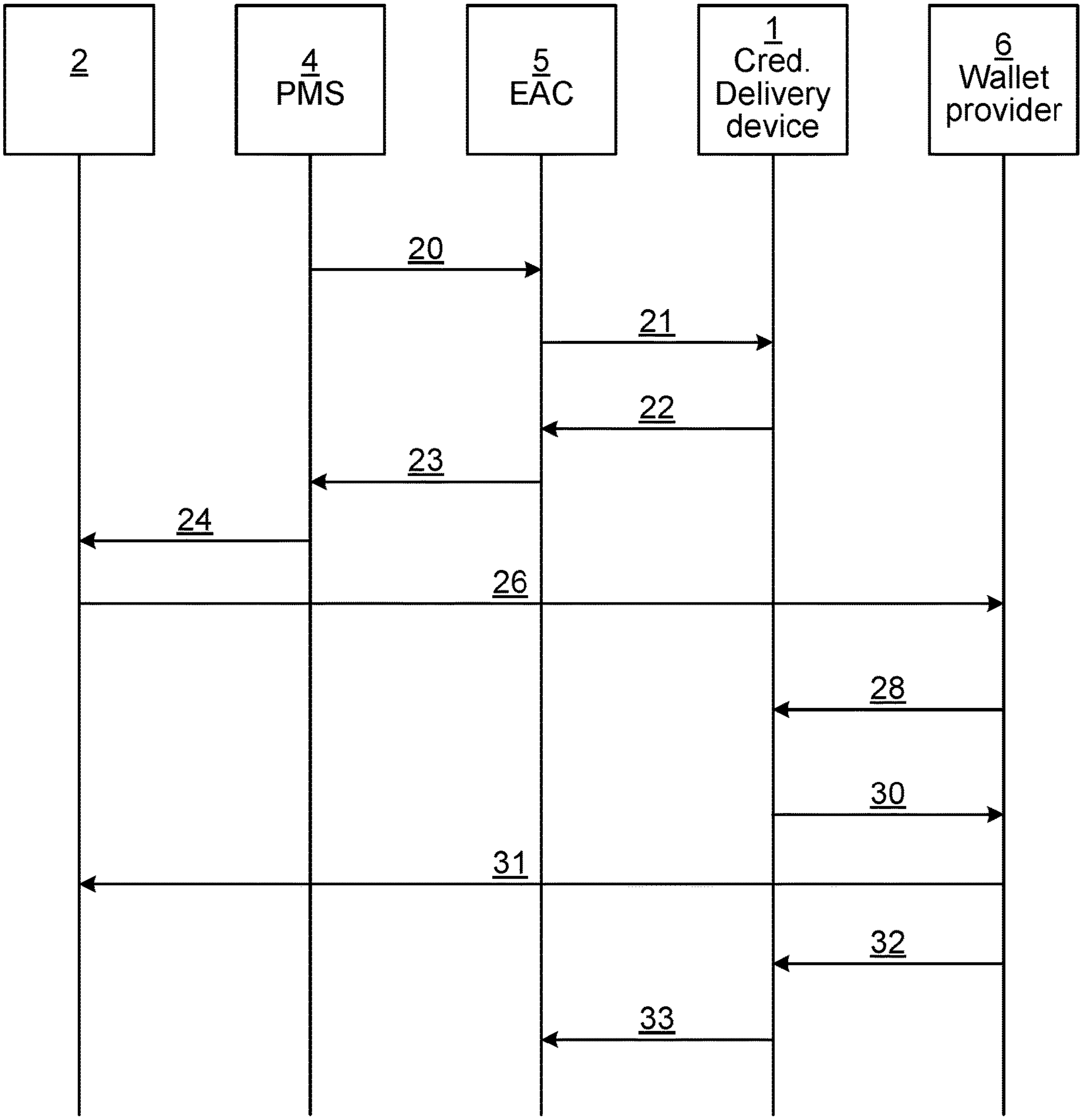
FIG. 2 is a sequence diagram illustrating communication between some of the entities in FIG. 1 for providing a credential for use with the electronic lock.

FIG. 2 is a sequence diagram illustrating communication between some of the entities in FIG. 1 for providing a credential for use with the electronic lock 7. This sequence can be performed to distribute a credential, e.g. when remote check-in is used. The communication between the different entities can be performed using any suitable current or future communication protocols, e.g. based on IP (Internet Protocol), such as HTTP (Hypertext transfer protocol) over TCP (Transport control protocol)/IP.

When the PMS 4 has assigned a physical space (e.g. a hotel room, cruise ship cabin, etc.) for a user, the PMS 4 sends a request 20 to the EAC 5 to issue a credential for the assigned physical space. The request 20 comprises an identifier of the physical space (e.g. room) to issue a credential for, and optionally a schedule or validity information of when the credential should be valid.

The EAC 5 generates a credential according to the request 20. The credential can be cryptographically encrypted and/or signed by the EAC 5. In this way, when the credential is eventually provided to the electronic lock 7, the electronic lock 7 can verify that the credential is validly generated by the EAC 5 and has not been tampered with. The EAC provides the generated credential 21 and optionally a domain cryptographic identifier to the credential delivery device 1. The domain cryptographic identifier is used to identify the site, e.g. a hotel. The domain cryptographic identifier can e.g. be in the form of a public key for the site. When the credential delivery device 1 encodes a credential for a specific wallet application (see below), the credential delivery device 1 can thus also encode the credential for a specific site based on the domain cryptographic identifier.

The credential delivery device 1 stores the credential and generates a credential identifier associated with the credential. The credential identifier can be any suitable number, alphanumeric string or data structure that can be electronically communicated. The credential identifier is at least locally unique (or even globally unique), allowing a credential to reliably be identified. However, the credential identifier is not the credential itself, whereby the credential identifier cannot be provided to the electronic lock 7 for unlocking.

The credential delivery device 1 provides the credential identifier 22 back to the EAC 5, which forwards the credential identifier 23 to the PMS 4. The PMS 4 has contact details for the user device 2, and forwards the credential identifier, e.g. embedded in a link, or obtainable using a link. The link is included in a message, e.g. in the form of an e-mail or text message delivered to the user device 2 or e.g. provided embedded in a QR code. The message can also include information of the restricted space (e.g. room or cabin) that is accessible using the credential. The credential identifier can be included in multiple links, where each link is tailored for a particular electronic provider. For instance, several links can be provided in the message with different labels, such as "Add to Google Pay", "Add to Apple Wallet", etc. Alternatively, the message contains a link to a web server that serves a web page that includes different links (each including the credential identifier) to the different electronic wallet providers for adding the credential to the respective electronic wallet app. Optionally, if the PMS 4 already has a record of the electronic wallet provider that is preferred (or has been used before) for a particular user device, the message can contain a direct link to add to such an electronic wallet, with a separate link for "other electronic wallet app".

When the user activates a link, e.g. by clicking the link, reading the QR code for the link, or automatic link processing in the user device 2, corresponding to the electronic wallet app in the user device 2, the link results in a credential request 26 (e.g. in the form of an HTTP request) to the electronic wallet provider 6 in question to add the credential to the electronic wallet app in the user device 2. This credential request 26 comprises the credential identifier. After receiving this request 26, the electronic wallet provider 6 sends a credential request 28 comprising the credential identifier, to the credential delivery device 1.

The credential delivery device 1 retrieves the stored credential associated with the credential identifier in the received request 28, optionally under a one-time use condition that the credential identifier has not been used previously to retrieve a credential. The credential delivery device 1 verifies that the credential, associated with the credential identifier, has not previously been used previously to retrieve a credential e.g. by checking presence in a list of active credential identifiers and/or absence in a list of used identifiers. When this one-time use condition is applied, once the stored credential has been retrieved, the credential identifier (received in the credential request 28) cannot be used again to retrieve the credential. This can be implemented by removing the received credential identifier from the list of active credential identifiers and/or adding the credential identifier to the list of used identifiers. Based on the type of electronic wallet provider (e.g. Google, Apple, etc.), the credential delivery device 1 packages the credential in a format that is usable with the particular electronic wallet provider 6. The credential delivery device 1 then sends a response 30 to the electronic wallet provider 6, wherein the response comprises the packaged credential.

The electronic wallet provider 6 now has the credential in an appropriate format and sends the credential 31 to the user device 2 for storage in the electronic wallet app in the user device 2.

Optionally, once the delivery of the credential 31 to the user device 2 has been confirmed, the electronic wallet provider 6 sends a confirmation 32 to the credential delivery device 1 that the packaged credential has been delivered to the user device 2. The credential delivery device 1 can then optionally send a corresponding confirmation 33 to the EAC 5 of the delivery.

Figure 3:
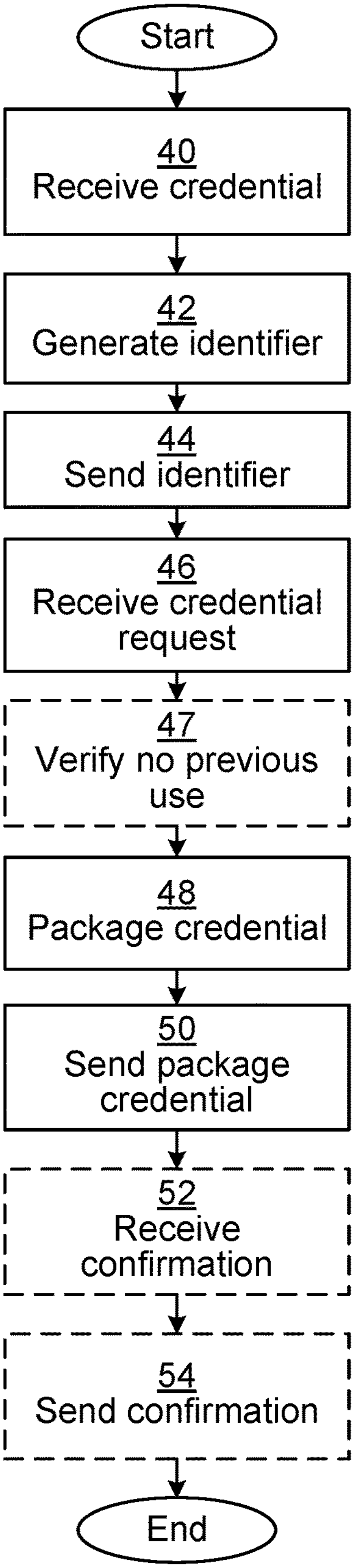
FIG. 3 is a flow chart illustrating embodiments of methods for providing a credential for use with an electronic lock to access to restricted physical space.

FIG. 3 is a flow chart illustrating embodiments of methods for providing a credential for use with an electronic lock 7 to access to restricted physical space 16. The method is performed by a credential delivery device 1, corresponding to the actions of the credential delivery device 1 depicted in FIG. 2 and described above. It is to be noted that this method can be performed asynchronously, in parallel and/or in sequence, for a plurality of different users and corresponding credentials and restricted physical spaces.

In a receive credential step 40, the credential delivery device 1 receives (from the EAC 5) a credential that, when provided to the electronic lock 7, unlocks the electronic lock 7. The credential can be associated with a particular electronic lock 7 for a particular restricted space. Optionally, the credential is also usable for common areas, e.g. gym, pool, lift, conference room, etc. The credential delivery device 1 stores the credential so that it is available when a request from the credential is received from the electronic wallet provider 6.

In a generate identifier step 42, the credential delivery device 1 generates a credential identifier associated with the credential. The credential identifier allows the credential delivery device to find the particular credential when multiple credentials are stored by the credential delivery device. Optionally, the generated credential identifier is added to a list of active credential identifiers.

In a send identifier step 44, the credential delivery device 1 sends the credential identifier to an EAC 5. As explained above, the EAC 5 then forwards the identifier for provision to the user device. The user device can then request to add the credential to an electronic wallet app on the user device, by interacting with an electronic wallet provider associated with the electronic wallet app, as explained above.

In a receive credential request step 46, the credential delivery device 1 receives, from an electronic wallet provider 6, a request for the credential, wherein the request comprises the credential identifier (that was sent in step 44). The electronic wallet provider 6 (Google, Apple, Samsung, etc.) is identifiable from the request that is received in this step, e.g. from the transmitter of the request or from a format of the request.

In an optional verify no previous use step 47, the credential delivery device 1 verifies that the credential identifier has not previously been used to provide a credential. In one embodiment, this comprises verifying that the credential, associated with the credential identifier, has not previously been included in a packaged credential sent to the electronic wallet provider. In other words, a one-time use condition is applied, ensuring that the credential identifier has not been used previously to retrieve a credential.

In one embodiment, this verification is implemented by checking the credential identifier against the list of active credential identifiers. The list of active credential identifiers then includes only credential identifiers that have not been used before for a credential included in a packaged credential sent to the electronic wallet provider. In this embodiment, the verification is successful if, and only if, the received credential identifier is included in the list of active credential identifiers.

In one embodiment, this verification is implemented by checking the credential identifier against the list of used credential identifiers. The list of used credential identifiers then includes credential identifiers that have been used before for a credential included in a packaged credential sent to the electronic wallet provider (and are thus blocked from being used again). In this embodiment, the verification is successful if, and only if, the received credential identifier is not in the list of used credential identifiers.

If the verification fails, the method ends. Otherwise, the method proceeds to a package credential step 48.

In the package credential step 48, the credential delivery device 1 (retrieves and) packages the credential, resulting in packaged credential. The packaging complies with a format, selected from a plurality of formats for different electronic wallet providers, corresponding to the electronic wallet provider from which the request is received. This enables the credential to be provided to an electronic wallet in a user device 2 for unlocking the electronic lock 7.

When the verify no previous use step 47 is performed, once the stored credential has been retrieved and/or packaged, this step includes updating records to ensure that the credential identifier (received in the credential request 28) cannot be used again to retrieve the credential. When there is a list of active credential identifiers, the credential identifier (of the request) is removed from the list of active credential identifiers. When there is a list of used credential identifiers, the credential identifier (of the request) is added to the list of used credential identifiers. In this way, the same credential identifier cannot be used several times to obtain a packaged credential, reducing the risk of a replay attack, where an attacker could attempt to re-use a credential identifier (e.g. obtained by eavesdropping) to obtain a packaged credential to gain unlawful access.

In a send packaged credential step 50, the credential delivery device 1 sends the packaged credential to the electronic wallet provider 6. As explained above, the electronic wallet provider 6 then forwards the credential to the electronic wallet app on the user device 2. The user device 2 can then be used to open the electronic lock 7 associated with the credential, e.g. by local communication (e.g. BLE, Bluetooth, NFC), between the user device 2 and the electronic lock 7.

In an optional receive confirmation step 52, the credential delivery device 1 receives a confirmation from the electronic wallet provider 6 that the packaged credential has been delivered to the user device 2.

In an optional send confirmation step 54, the credential delivery device 1 sends a confirmation to the EAC 5 that the packaged credential has been delivered to the user device 2. This is a feedback mechanism allowing the EAC 5 to keep a record of confirmed credential delivery.

Using these embodiments, delivery of a credential to an electronic wallet application is enabled, even when the electronic wallet provider is not known at the time that the credential is generated. These embodiments enable a convenient, yet secure, process for providing credentials to a user device, e.g. when the user performs a remote check-in to a hotel room or cruise ship cabin. In this way, the user does not need to interact with a front desk or similar, and can proceed directly to the room or cabin assigned to the user. Additionally, this solution is easily extended to new electronic wallet formats in the future, or adapted when the format for existing electronic wallet providers changes.

Figure 4:
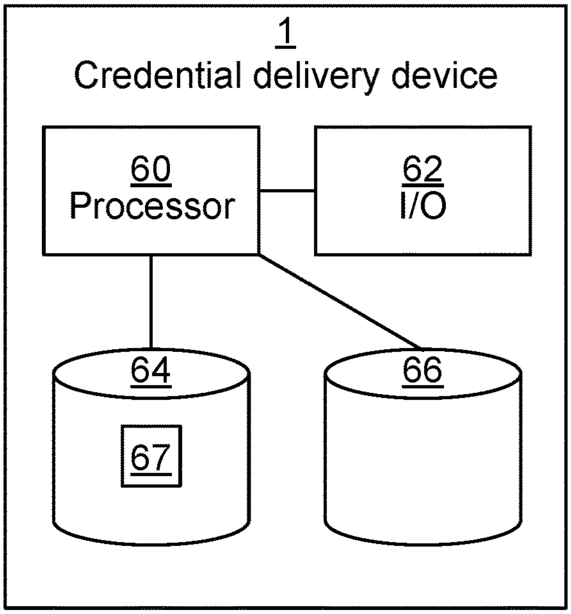
FIG. 4 is a schematic diagram illustrating components of the credential delivery device of FIG. 1.

FIG. 4 is a schematic diagram illustrating components of the credential delivery device 1 of FIG. 1. It is to be noted that when the credential delivery device 1 is implemented in a host device, such as the EAC 5, one or more of the components mentioned below can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The credential delivery device 1 further comprises an I/O interface 62 for communicating with external and/or internal entities. Optionally, the I/O interface 62 also includes a user interface.

Other components of the credential delivery device 1 are omitted in order not to obscure the concepts presented herein.

Figure 5:
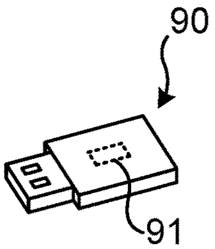
FIG. 5 shows one example of a computer program product 90 comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 4. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for providing a credential for use with an electronic lock to access to restricted physical space, the method being performed by a credential delivery device, the method comprising:

receiving a credential that, when provided to the electronic lock, unlocks the electronic lock;

generating a credential identifier associated with the credential;

sending the credential identifier to an electronic access control system, EAC;

receiving, from an electronic wallet provider, a request for the credential, wherein the request comprises the credential identifier;

packaging the credential, resulting in a packaged credential, wherein the packaging complies with a format, selected from a plurality of formats for different electronic wallet providers, corresponding to the electronic wallet provider from which the request is received, enabling the credential to be provided to an electronic wallet in a user device for unlocking the electronic lock; and sending the packaged credential to the electronic wallet provider.

2. The method according to claim 1, further comprising:

receiving a confirmation from the electronic wallet provider that the packaged credential has been delivered to the user device.

3. The method according to claim 2, further comprising, after the receiving a confirmation:

sending a confirmation to the EAC that the packaged credential has been delivered to the user device.

4. The method according to claim 1, wherein, in the receiving the credential step, the credential is received from the EAC.

5. The method according to claim 1, further comprising:

verifying that the credential identifier has not previously been used to provide a credential.

6. The method according to claim 5, wherein the verifying comprises verifying that the credential, associated with the credential identifier, has not previously been included in a packaged credential sent to the electronic wallet provider.

7. The method according to claim 5, wherein the verifying comprises verifying by checking the credential identifier against a list of active credential identifiers.

8. The method according to claim 5, wherein the verifying comprises verifying by checking the credential identifier against a list of used credential identifiers.

9. A credential delivery device for providing a credential for use with an electronic lock to access to restricted physical space, the credential delivery device comprising:

a processor; and a memory storing instructions that, when executed by the processor, cause the credential delivery device to:

receive a credential that, when provided to the electronic lock, unlocks the electronic lock;

generate a credential identifier associated with the credential;

send the credential identifier to an electronic access control system, EAC;

receive, from an electronic wallet provider, a request for the credential, wherein the request comprises the credential identifier;

package the credential, resulting in a packaged credential, wherein packaging the credential complies with a format, selected from a plurality of formats for different electronic wallet providers, corresponding to the electronic wallet provider from which the request is received, enabling the credential to be provided to an electronic wallet in a user device for unlocking the electronic lock; and send the packaged credential to the electronic wallet provider.

10. The credential delivery device according to claim 9, wherein the memory further stores instructions that, when executed by the processor, cause the credential delivery device to:

receive a confirmation from the electronic wallet provider that the packaged credential has been delivered to the user device.

11. The credential delivery device according to claim 10, wherein the memory further stores instructions that, when executed by the processor, cause the credential delivery device to:

send a confirmation to the EAC that the packaged credential has been delivered to the user device.

12. The credential delivery device according to claim 9, wherein the instructions to receive the credential comprise instructions that, when executed by the processor, cause the credential delivery device to receive the credential from the EAC.

13. The credential delivery device according to claim 9, wherein the memory further stores instructions that, when executed by the processor, cause the credential delivery device to:

verify that the credential identifier has not previously been used to provide a credential.

14. The credential delivery device according to claim 13, wherein the instructions to verify comprise instructions that, when executed by the processor, cause the credential delivery device to:

verify that the credential, associated with the credential identifier, has not previously been included in a packaged credential sent to the electronic wallet provider.

15. The credential delivery device according to claim 13, wherein the instructions to verify comprise instructions that, when executed by the processor, cause the credential delivery device to check the credential identifier against a list of active credential identifiers.

16. The credential delivery device according to claim 13, wherein the instructions to verify comprise instructions that, when executed by the processor, cause the credential delivery device to check the credential identifier against a list of used credential identifiers.

17. A non-transitory computer readable medium storing a computer program for providing a credential for use with an electronic lock to access to restricted physical space, the computer program comprising computer program code which, when executed on a credential delivery device causes the credential delivery device to:

receive a credential that, when provided to the electronic lock, unlocks the electronic lock;

generate a credential identifier associated with the credential;

send the credential identifier to an electronic access control system, EAC;

receive, from an electronic wallet provider, a request for the credential, wherein the request comprises the credential identifier;

package the credential, resulting in packaged credential, wherein the packaging the credential complies with a format, selected from a plurality of formats for different electronic wallet providers, corresponding to the electronic wallet provider from which the request is received, enabling the credential to be provided to an electronic wallet in a user device for unlocking the electronic lock; and send the packaged credential to the electronic wallet provider.

* * * * *